FREQUENCY SHIFTED SLIDING TONE SAMPLED DATA COMMUNICATION SYSTEM
Filed Jan. 3, 1966 4 Sheets-Sheet 1
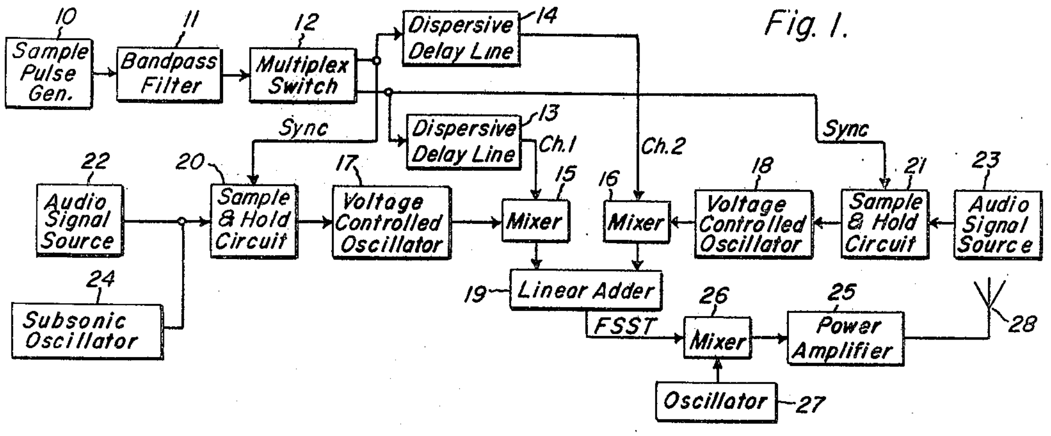
Fig.3A
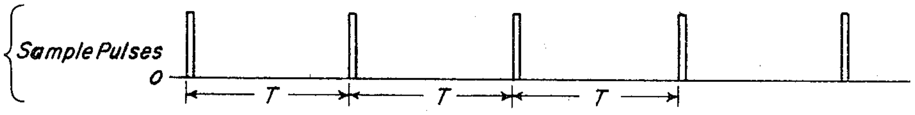
Fig.3B
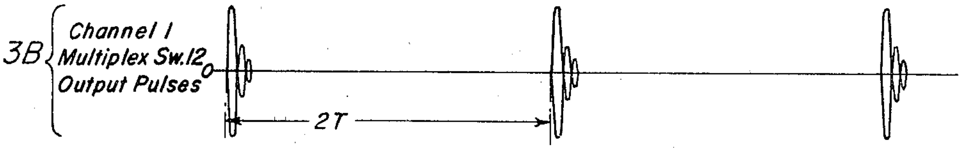
Fig.3C
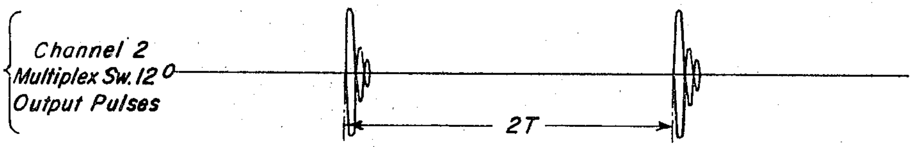
Fig.3D
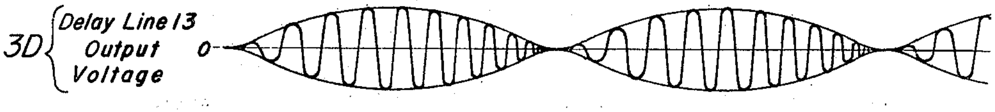
Fig.3E
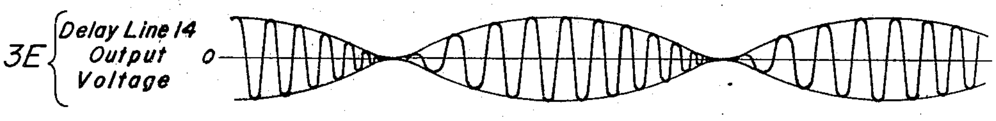
Fig.3F
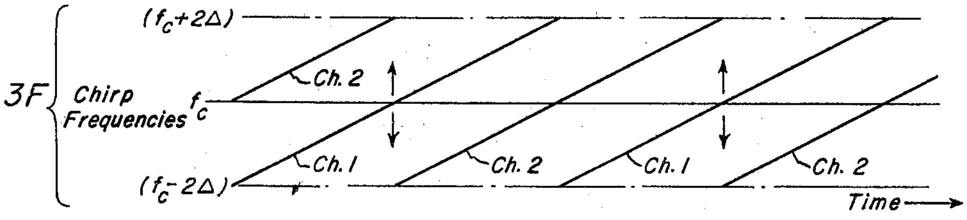
Inventor:
Kouan Fong,
by Marvin Snyder
His Attorney.

FREQUENCY SHIFTED SLIDING TONE SAMPLED DATA COMMUNICATION SYSTEM

Filed Jan. 3, 1966 4 Sheets-Sheet 2

Inventor:
Kouan Fong,
by Marvin Snyder
His Attorney.

FREQUENCY SHIFTED SLIDING TONE SAMPLED DATA COMMUNICATION SYSTEM

Filed Jan. 3, 1966 4 Sheets-Sheet 3

Inventor:
Kouan Fong,
by Marvin Snyder
His Attorney.

FREQUENCY SHIFTED SLIDING TONE SAMPLED DATA COMMUNICATION SYSTEM

Filed Jan. 3, 1966 4 Sheets-Sheet 4

Inventor:
Kouan Fong,
by Marvin Snyder
His Attorney.

United States Patent Office 3,484,693

Patented Dec. 16, 1969

3,484,693

FREQUENCY SHIFTED SLIDING TONE SAMPLED DATA COMMUNICATION SYSTEM

Kouan Fong, Schenectady, N.Y., assignor to General Electric Company, a corporation of New York Filed Jan. 3, 1966, Ser. No. 518,376

Int. Cl. H04j 1/00

U.S. Cl. 325—30 18 Claims

ABSTRACT OF THE DISCLOSURE

A multiplex communication system transmits signals in the form of "chirps" or sliding tones of linearly increasing frequency and Gaussian amplitude. In each channel, modulation is accomplished by varying the mean frequency of each chirp in accordance with sampled amplitude of baseband signal. By time-overlapping consecutive chirps, which are produced on consecutive channels respectively, frequency band occupancy is increased and noise improvement threshold is decreased. Received chirps are converted to position modulated pulses by a dispersive delay line acting as a pulse compressor, and are then converted to amplitude modulated pulses allocated to their respective channels.

This invention relates to data communication systems, and more particularly to communication systems of very high signal-to-noise recovery ratio employing frequency shifting of repetitive sliding tones wherein high signal-to-noise ratio is achieved by increasing bandwidth occupancy.

Much current interest in high grade analog data communication systems stems from space applications wherein communication over long distances necessitates use of high signal-to-noise ratios. Such communication systems, moreover, may require multiple data channel communication capability, in order to transmit a maximum amount of data on any single carrier frequency. Large index frequency modulation, or frequency modulation having a high ratio of frequency deviation to modulating frequency, provides sufficiently high signal-to-noise ratio for such communication; further, a frequency modulated system, which inherently equates peak power with average power can improve the signal-to-noise ratio under peak power limited conditions by widening the carrier bandwidth. However, large index frequency modulation has a relatively poor noise improvement threshold; that is, the minimum radio-frequency signal power required to overcome noise introduced within the transmission medium is relatively high for large index frequency modulation. An improvement in the quality of transmission by adopting a larger index of modulation can therefore be realized only if the received power exceeds the noise improvement threshold, so as to overcome noise introduced in transmission. The advantage of making the noise improvement threshold as low as possible is thus plainly evident.

Heretofore, a reduction in noise improvement threshold has been achieved by hybrid modulation known as pulse amplitude modulated-frequency modulation or PAM–FM. This is produced as a result of sampling a baseband input signal and modulating a carrier signal frequency in accordance with the amplitude of the sample pulses. Thus, the signal transmitted is of constant frequency during each sampling interval, but varies in frequency from one interval to the next. Such a system is highly amenable to time-division multiplexing, since samples of a plurality of modulating signals may be interlaced in the transmitted signal. However, the constant frequency modulating signals impressed upon the carrier must not overlap each other in time, since such overlap creates spurious pulses at the receiver. Further, although operation at peak efficiency requires that maximum signal power be maintained throughout each entire sampling interval, meeting this requirement in the PAM–FM system results in generation of side-lobes along with the pulses produced by the receiver, increasing the likelihood of undesirable interference in the receiver output signal.

The present invention is concerned with achieving still further reduction in the noise improvement threshold by employing another form of hybrid modulation which may be designated frequency shifted sliding tone, or FSST modulation. In this form of modulation, an entire sliding tone, or "chirp," comprising a linear sweep of frequencies within predetermined limits, is shifted in frequency by a constant amount in accordance with the sampled amplitude of a baseband signal. Such modulation permits time overlapping of adjacent samples in transmission, without increased susceptibility to loss of synchronization, by allowing the time overlap of adjacent chirps without creating spurious pulses. Although this overlap increases frequency band occupancy, it also allows maintenance of peak signal power uniformly throughout each entire sampling interval, thus improving efficiency of transmission. Moreover, since noise adds to the signal in proportion to the square root of the bandwidth, while signal amplitude is proportional to bandwidth, the increased frequency band occupancy brings about an attendant improvement in signal-to-noise ratio, resulting in a decreased noise improvement threshold.

A further advantage of the present invention arises as a result of a unique characteristic of the chirp; namely, that because the chirp comprises a swept range of frequencies about a center frequency which is maintained between predetermined limits, compression of each chirp into a narrow pulse having a time delay corresponding to the center frequency is readily obtainable by use of a suitable filter. Hence, the samples are easily separated despite their overlapping in time. Therefore, the major difficulties inherent in the PAM–FM system are overcome in the FSST system.

One object of this invention is to provide a frequency shifted sliding tone analog data communication system.

Another object is to provide a multiplex communication system having a reduced noise improvement threshold.

Another object is to provide a sampled data communication system of high signal-to-noise ratio wherein transmitted consecutive samplings are overlapped in time in order to enhance quality of the received signal.

Another object is to provide a hybrid modulation system wherein the mean frequenecy of repetitive chirps is shifted by an amount varying linearly with sampled amplitude of baseband signals.

Briefly stated, the invention contemplates a sampled data communication system comprising transmitting means including a plurality of channels, each channel including means for repetitively generating uniform bandwidth linear frequency sweeps through a frequency spectrum. Each frequency sweep generating means operates at a common sweep repetition rate and coherent phase. Each channel also includes a source of baseband signals, variable frequency generating means responsive to the baseband signal source and producing an output frequency varying discretely in accordance with instantaneous amplitude of the baseband signals at predetermined sampling instants, and frequency mixing means responsive jointly to the linear frequency sweep generating means and the variable frequency generating means for providing output linear frequency sweeps through uniform bandwidth portions of the frequency spectrum selected in accordance with the discretely varying output frequency. In addition, the transmitting means includes linear adder means responsive to the frequency mixing means of each channel for interlacing the output linear frequency sweeps of each channel. Pulse receiving means, including pulse compressing means responsive to the output of the linear adder means, and pulse distributing means responsive to the pulse compressing means for allocating pulses to individual channel outputs, are also provided.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 1 is a block diagram of a transmitter intended for use in the sampled data communication system of the instant invention;

FIGURES 3A–3F are waveform drawings illustrating operation, with respect to time, of various subcombinations incorporated in the transmitter of the instant invention;

Figure 2:
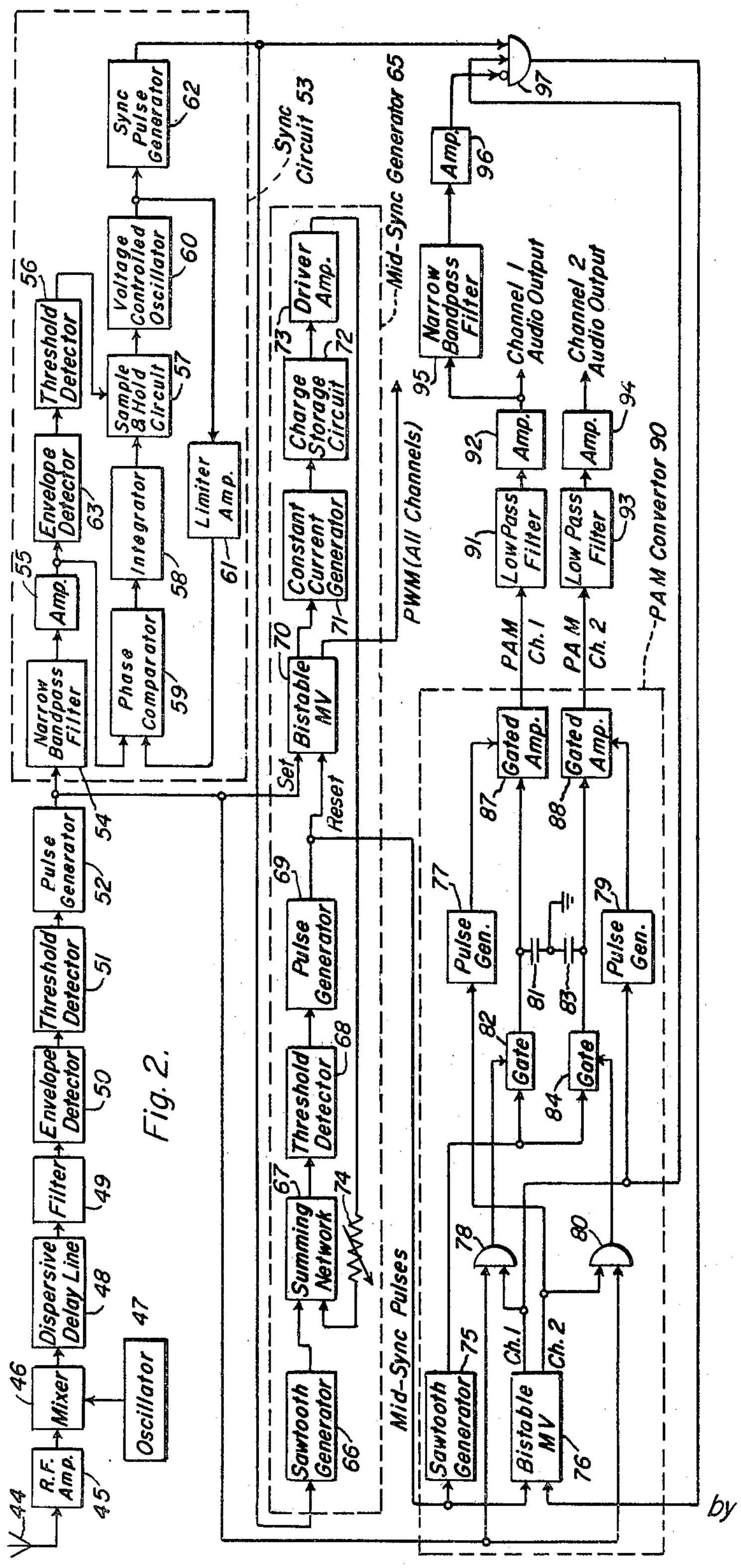
FIGURE 2 is a block diagram of a receiver intended for use in the system of the instant invention.

In FIGURE 1, a sample pulse generator 10 is shown supplying uniformly-spaced sharp pulses at a suitable repetition rate, such as 25 kilocycles per second, to a suitable bandpass filter 11, which transforms each pulse into a short burst of complex waveform voltage centered at the median frequency of the filter. It should be noted that although 25 kilocycles are used for illustrative purposes, sampling rates at megacycle frequencies are also feasible in the system, and are especially advantageous in systems utilizing large numbers of communication channels or employing means for communicating baseband signals of very high frequency.

Each burst of complex waveform voltage, which contains all the sinusoidal Fourier components necessary to construct the chirp or sliding tone to be modulated, is supplied by the bandpass filter to the input of a distributor or multiplex switch 12 which transfers alternate bursts to each of two dispersive delay lines 13 and 14. Such multiplex switches are well-known, and, as one example, may suitably be constructed of a plurality of gates, each gate actuated by a separate stage of a ring counter.

Each of the dispersive delay lines represents the input of a separate signal channel, so that for the system shown, only two signal channels, each driven at half the pulse repetition rate of sample pulse generator 10, such as 12.5 kilocycles per second, are provided. However, more than two channels can be provided simply by using a composite modulating signal on each channel according to one of many well-known time division or frequency division multiplex schemes. In case of a time division multiplex scheme, for example, with each channel subdivided into $n$ channels and a pulse repetition rate of 25 kilocycles per second for pulse generator 10, each of the subdivided channels would be driven at a repetition rate of $25/2n$ kilocycles per second.

Each of dispersive delay lines 13 and 14 is capable of providing pulse dispersion or compression, as the case may be, since the delay varies linearly with frequency, so that greater delay is encountered by higher frequencies than by lower frequencies. Delay lines of this nature are well-known in the art; see, for example, J. R. Klauder et al., The Theory and Design of Chirp Radars, 39 Bell System Technical Journal, 745 (July 1960); see also G. A. Coquin et al., Theory and Performance of Perpendicular Diffraction Delay Lines, 53 Proceedings IEEE 581 (June 1965). In the transmitter delay lines 13 and 14 disperse the repetitive pulses produced by multiplex switch 12 which contain the aforementioned sinusoidal Fourier components, thereby producing repetitive chirps. The chirp produced by each of the delay lines preferably overlaps, in time, the next successsive chirp produced by the delay line next receiving an input pulse from multiplex switch 12 by an amount of up to one-half the duration of either chirp.

FIGURES 3A–3F, which are plotted on a common time scale, provide graphical illustration of how the transmitter chirps are produced. FIGURE 3A illustrates sample pulses generated by sample pulse generator 10, which are represented as being relatively rectangular in shape. These pulses are spaced at regular intervals, designated T. FIGURES 3B and 3C illustrate the output pulses supplied by multiplex switch 12 to dispersive delay lines 13 and 14, respectively. The pulses supplied to delay line 13 initiate repetitive chirps for channel 1, and the pulses supplied to delay line 14 initiate repetitive chirps for channel 2. It should be noted that the pulses produced for each of channels 1 and 2 occur at one-half the repetition rate of the sample pulses shown in FIGURE 3A and are separated by regular intervals of 2T. In addition, the output pulses produced by multiplex switch 12 are slightly altered in configuration from the pulses produced by sample pulse generator 10. The change in configuration is produced by bandpass filter 11, which filters out all but the frequency components which are to comprise the output chirps of delay lines 13 and 14, and determines the voltage envelope shape of these chirps.

Each pulse shown in FIGURES 3B and 3C is dispersed into its component frequencies by delay lines 13 and 14, respectively, so that the lowest frequency components are produced at the output of the delay lines first, and the highest frequency components are produced last. The voltage envelopes of these frequency components are preferably of Gaussian amplitude, as shown in FIGURES 3D and 3E, for purposes described infra, while the frequency components themselves are illustrated as increasing in frequency with time. The unmodulated chirp frequencies are plotted against time in FIGURE 3F, and show the frequency sweeps for each channel about a center frequency $f_c$. The chirps of FIGURE 3F are shown with maximum time overlap; that is, overlap of approximately a whole chirp duration. The overlap shown in FIGURE 3F allows maximum power transmission since the output voltages shown in FIGURES 3D and 3E may be added together in the transmitter to provide a substantially constant amplitude transmitter output signal. Each chirp is assumed to have a frequency range of $4\Delta$ so that each unmodulated chirp varies from a frequency of $(f_c-2\Delta)$ to $(f_c+2\Delta)$. Maximum modulation is assumed to be $\pm\Delta$ on each channel.

In the transmitter of FIGURE 1, outputs of dispersive delay lines 13 and 14 are applied to one input of two-input mixer circuits 15 and 16, respectively. In addition, outputs of a pair of voltage controlled oscillators 17 and 18, each of which produces an output signal $f_m$, are applied to the other input of each of mixers 15 and 16, respectively. When no modulating signal is to be carried on either channel, each of voltage controlled oscillators 17 and 18 produces an output signal of frequency $f_{mo}$ which is mixed in mixers 15 and 16, respectively, with the chirp frequencies produced by dispersive delay lines 13 and 14, respectively. Mixers 15 and 16 thus produce output frequencies comprising chirps of total frequency swing $4\Delta$ about a center frequency $(f_c+f_{mo})$. Mixers 15 and 16 are broadly tuned to this center frequency, so that lower sidebands of the output signal are attenuated and only upper sidebands appear at the output. These upper sidebands are supplied to a linear adder 19, which comprises a low insertion-loss amplifier having a plurality of inputs, with high isolation between inputs. Thus, output signals produced by mixers 15 and 16, although supplied to different inputs of a common circuit, do not interact with each other. The output voltage of linear adder 19 thus assumes a waveform representing the sum of the waveforms in FIGURES 3D and 3E. The frequency components of the output signal of linear adder 19 appear as depicted in FIGURE 3F, with the exception that the chirps are now centered about a frequency $(f_c+f_m)$ and can vary between frequency limits of $(f_c+f_m-2\Delta)$ and $(f_c+f_m+2\Delta)$. Since maximum modulation on each channel is assumed to be $\pm\Delta$, $f_m$ may vary from $(f_{mo}-\Delta)$ to $(f_{mo}+\Delta)$.

Output frequencies produced by voltage controlled oscillators 17 and 18 are dependent upon the amplitude of input voltage applied thereto. As previously stated, the output frequency of each of voltage controlled oscillators 17 and 18, with no applied input voltage, is a steady value $f_{mo}$. However, voltage is applied to oscillators 17 and 18 from sample and hold circuits 20 and 21, respectively. Sample and hold circuits are well-known in the art, as shown in M. E. Connelly U.S. Patent 3,077,544, issued Feb. 12, 1963. Such circuit provides amplitude sampling of a relatively slowly varying signal at an externally controlled rate, and produces a constant output voltage level which changes abruptly in accordance with the sampled amplitude at each instant of sampling. In this case, the sampling rate is controlled by multiplex switch 12, so that sample and hold circuits 20 and 21 are synchronized with the channel 2 and channel 1 outputs of multiplex switch 12, respectively.

Sample and hold circuits 20 and 21 provide sampling of a pair of audio baseband signal sources 22 and 23, respectively. These audio signal sources may comprise voice channels, analog data channels, or a combination of both. For channel identification, a subsonic frequency oscillator 24, or ultrasonic if preferred, may be connected in parallel with audio signal source 22. At the receiver, the subsonic tone produced by oscillator 24 may be attenuated by a suitable high pass filter so as to avoid all possibility of interference with any data modulation carried on the same channel.

Each time a channel 2 output pulse is produced by multiplex switch 12, sample and hold circuit 20 is driven to make a new sampling of the audio signal output from audio signal source 22 along with the superimposed signal produced by constant frequency oscillator 24. This sampling results in application of a new voltage amplitude to voltage controlled oscillator 17 which accordingly produces a new steady-state signal of frequency proportional to the applied voltage amplitude until the next sampling is initiated by the next channel 2 output pulse of multiplex switch 12. After the channel 2 output pulse is produced by multiplex switch 12, resulting in a new steady output frequency from voltage controlled oscillator 17, the channel 1 output pulse produced by multiplex switch 12 initiates a chirp from dispersive delay line 13 which is combined in mixer 15 with the new signal from voltage controlled oscillator 17. This shifts the entire frequency range of the channel 1 chirp to a value wherein the median frequency is proportional to the latest sampled amplitude of baseband signal.

Simultaneous with application of a pulse to dispersive delay line 13 by the channel 1 output of multiplex switch 12, sample and hold circuit 21 makes a new sampling of the output produced by audio signal source 23, in order to provide a new voltage to voltage controlled oscillator 18. In this fashion, a new constant output frequency proportional to the new sampled voltage amplitude is produced by voltage controlled oscillator 18. The next chirp produced by dispersive delay line 14 is mixed with this new output frequency, shifting the entire frequency range of the chirp at the output of mixer 16 to a value wherein the median frequency is proportional to the latest sampled amplitude of baseband signal on channel 2. Modulation of the repetitive chirps is thereby achieved through a process herein designated FSST, or frequency shifted sliding tone modulation.

Figures 4A, 4B, 4C, 5A, 5B:
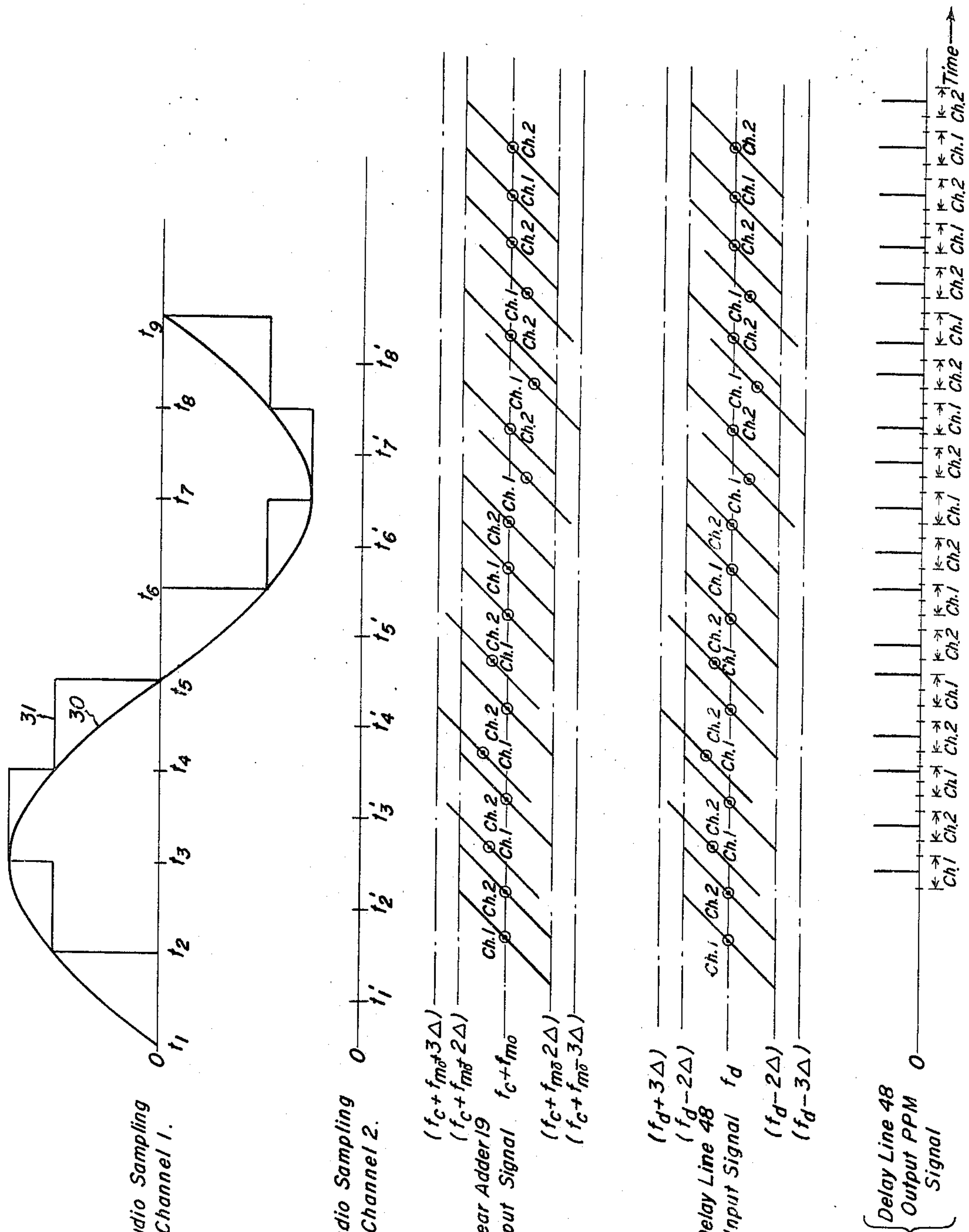
FIGURES 4A–4C are waveforms to aid in illustrating modulated chirps on channel 1 interlaced with unmodulated chirps on channel 2.
FIGURES 5A and 5B are waveforms to aid in illustrating conversion of modulated chirps on channel 1 interlaced with unmodulated chirps on channel 2, to position modulated pulses.

FIGURES 4A–4C, which are plotted on a common time scale, depict the modulation process for the case where modulation is applied to channel 1 and no modulation is applied to channel 2. Thus, in FIGURE 4A a baseband voltage 30 is shown undergoing sampling. This sampling, which is initiated by the pulses illustrated in FIGURE 3C, occurs at regularly spaced intervals designated $t_1$–$t_9$, each interval extending for a duration 2T. The sampling frequency is preferably twice the frequency of the sampled wave, or higher, in order to obtain enough samples to facilitate accurate reproduction of the baseband signals at the receiver.

After each sampling, amplitude of the sampled voltage is maintained by sample and hold circuit 20 of FIGURE 1, so that the output waveform of the sample and hold circuit is illustrated by waveform 31 of FIGURE 4A. FIGURE 4B shows sampling also occurring at instants designated $t_1'$–$t_8'$. These sampling instants occur midway between each pair of sampling instants of channel 1, and are initiated by the pulses illustrated in FIGURE 3B. Since, for convenience of illustration, no audio modulation is assumed to be applied to channel 2, the output voltage of sample and hold circuit 21 is zero.

FIGURE 4C illustrates the resultant frequency waveforms, with respect to time, produced by linear adder 19 of FIGURE 1. To aid in visualizing the composite output of linear adder 19, the center frequency of each chirp in FIGURE 4C is encircled and its channel of origin designated directly above or below the encircled point. Thus, it can be seen that the first chirp produced on channel 1, which results from sampling at time $t_1$, begins at a time subsequent to time $t_1$ due to delay introduced by dispersive delay line 13. Succeeding chirps are each delayed by the same amount. Even if channel 1 were 100 percent modulated in the positive direction and channel 2 were 100 percent modulated in the negative direction, so that at any selected instant the frequency of the channel 1 chirp surpassed the frequency of the preceding channel 2 chirp, the channel 2 chirp center frequency would still occur at the same time in relation to the channel 1 chirp center frequency. It is this fact which facilitates demodulation in the receiver without confusion of channels.

Returning to FIGURE 1, the frequency shifted sliding tones produced by linear adder 19, as illustrated in FIGURE 4C, may be supplied directly to a power amplifier 25 for radiation from an antenna 28, or transmission through conducting means if preferred, to a receiver. In the event an increased carrier frequency is desired, output from linear adder 19 may be supplied to one input of a two-input mixer 26 having its second input energized by a constant frequency oscillator 27. The lower sidebands produced by mixer 26 are then attenuated by filter means within the mixer, and the upper sidebands are supplied to power amplifier 25 for communication to the receiver.

The transmitter output signal, if communicated by radio, is received by the receiver of FIGURE 2 at an antenna 44 which supplies the received signal through a radio-frequency amplifier 45 to one input of a two-input mixer 46 having its second input energized by a local oscillator 47. The lower sidebands of the mixer output signal, which, when no modulation is communicated, comprise chirps of median frequency $f_d$, are supplied to the input of a dispersive delay line 48.

If receiver delay line 48 is substantially identical to dispersive delay lines 13 and 14 used in the transmitter as shown in FIGURE 1, then $f_c$ and $f_d$ should be made identical. Letting $f_t$ represent the frequency of transmitter oscillator 27 if used, and $f_r$ represent the frequency of local oscillator 47, then $$f_d = f_r - (f_t + f_c + f_{mo})$$

Letting $$f_r = (f_t + f_{mo} + 2f_c)$$

then $$f_d = f_c$$

In this instance, the frequency spectrum at the input of receiver delay line 48 is inverted with respect to the transmitted waveform spectrum, so that a spectral line $(f_t + f_{mo} + f_c + f_x)$ in the transmitted waveform corresponds to a spectral line $(f_c - f_x)$, where $f_x$ is less than or equal to $3\Delta$.

Delay line 48 serves as a pulse compressor; that is, each received chirp is supplied to the delay line and compressed into a narrow pulse having its position shifted in accordance with the mean frequency of the chirp, since the low frequencies of each chirp, which are received first, pass through the delay line at a faster rate than the earlier-received high frequencies. Moreover, this delay line is linear over a wider bandwidth than delay lines 13 and 14, since the mean frequency of received chirps may vary by $\pm\Delta$.

FIGURES 5A and 5B, which are plotted on a common time scale, are schematic illustrations of waveform conversions accomplished by delay line 48. FIGURE 5A illustrates signal frequencies supplied by mixer 46 to delay line 48. These freqeuncies are supplied in the form of modulated chirps on channel 1 and unmodulated chirps on channel 2, since they represent the results of sampling in accordance with the illustrations of FIGURES 4A and 4B. Thus, FIGURE 5A is identical in configuration to FIGURE 4C, but varies about a different center frequency.

FIGURE 5B illustrates output of delay line 4B for an input as depicted in FIGURE 5A, showing the shifted position of each compressed channel chirp. It should be noted that each compressed channel 2 chirp occurs in the center of the time allocated to receipt of each channel 2 pulse, due to the absence of modulation. As represented in FIGURES 5A and 5B, each compressed pulse on channel 1 is shifted to a later or delayed position in the time allocated to the channel if the center frequency of the chirp producing this pulse exceeds frequency $f_d$, and is shifted to an earlier position in the time allocated to the channel if the center frequency of the chirp lies below frequency $f_d$. This follows from the fact that low frequencies pass through the delay line faster than high frequencies, so that the compressed modulated output pulse is shifted either ahead of or behind the instant at which a compressed unmodulated pulse would be supplied by the delay line. To enable proper allocation of data to respective channels, the compressed pulses should not overlap since, due to the limited bandwitdth, they require finite durations. Nominal time deviation for 100 percent modulation should require slightly less than half the interval between two adjacent sampling instants at the transmitter, in order to create guardbands between each of the adjacent position modulated pulses produced by dispersive delay line 48.

In the receiver of FIGURE 2, output from dispersive delay line 48 is supplied through a noise filter 49 to the input of an envelope detector 50, which removes the high frequency components of the signal and supplies only the position modulated pulses shown in FIGURE 5B, along with some noise, to the input of a threshold detector 51, which may conveniently comprise a Schmitt trigger circuit. The purpose of the cascade combination of bandpass filter 49 and envelope detector 50 is to prevent an increase in noise bandwidth of the received frequency shifted linear frequency sweeps beyond that which would apply only to unmodulated linear frequency sweeps. Thus, when a carrier comprising linear frequency sweeps of mean frequency $f_1$, modulated by a real waveform, passes through a symmetrical bandpass filter of center frequency $f_0$, the output constitutes a complex waveform modulating the original carrier of mean frequency $f_1$. If the filter spectrum is such that the complex modulating waveform can be expressed as a real waveform modulating a subcarrier, so that only the proportional factor of the new real waveform and the subcarrier frequency is a function of the frequency difference $f_1 - f_0$, and provided further that the proportional factor is changed by only a small amount with a change in frequency $f_1$, then it can be shown that the resultant output signal-to-noise ratio remains substantially unchanged with variations in frequency $f_1$ and is not degraded by frequency shift modulation of the linear frequency sweep. This condition is fulfilled by judicious selection of filter spectrum and transmitted waveform, such as Gaussian amplitude of the transmitted waveform of each sample and a Gaussian spectrum for filter 49.

Threshold detector 51 further eliminates spurious noise pulses from the signal by producing a trigger pulse in response only to signals about a predetermined threshold amplitude. These signals are then supplied to a pulse generator 52, which effectively reshapes the output pulses produced by the threshold detector into uniform rectangular pulses.

Pulses produced by pulse generator 52 are supplied to a sync circuit 53. This circuit is disclosed and claimed in my copending application, Ser. No. 518,205, filed concurrently herewith, now Patent 3,462,551 granted Aug. 19, 1969 anl assigned to the instant assignee. The purpose of this circuit is to provide output pulses at a repetition rate identical to that of sample pulse generator 10 in the transmitter.

In particular, pulses from pulse generator 52 are supplied to the input of a narrow bandpass filter 54 preferably having a bandwidth of only a few cycles. Output of narrow bandpass filter 54 is amplified by an amplifier 55, and applied through an envelope detector 63 to a threshold detector 56, which preferably comprises a Schmitt trigger circuit. Threshold detector 56, in response to the envelope of signals passed by filter 54 above a predetermined amplitude, maintains a sample and hold circuit 57 in a conductive condition to enable a continuously varying input to be supplied via the sample and hold circuit from a relatively long time-constant integrator 58 to a voltage controlled oscillator 60. The integrator, in turn, receives its input signal from a two-input phase comparator 59 having one input energized by amplifier 55 and the second input energized by a constant voltage of comparable amplitude supplied by voltage controlled oscillator 60 through an amplifier 61. The frequency of voltage controlled oscillator 60 is controlled by the output of sample and hold circuit 57, or, in absence of this output, may be internally crystal-controlled.

Voltage controlled oscillator 60, with no input voltage supplied thereto, produces an output signal frequency which drives a sync pulse generator 62 at the center frequency of filter 54. This signal is then supplied to the input of a sawtooth generator 66 in a mid-sync generator circuit 65.

When modulated pulses are received from the transmitter, the nature of the modulation, generally, is such that the repetition rate of two adjacent pulses may temporarily be considerably different from the pulse repetition rate of sample pulse generator 10 of the transmitter, so that filter 54 temporarily produces no output signal; however, on a longer time average, the transmitted pulse repetition rate is identical to that of sample pulse generator 10. Therefore, despite short-term variations in the repetition rate of received pulses, integrator 58 maintains a substantially constant output voltage because of its relatively long time-constant. The substantially constant output voltage of integrator 58 is continuously applied to voltage controlled oscillator 60, and sync pulse generator 62 continues to operate at the pulse repetition rate of sample pulse generator 10.

In the event the pulse repetition rate of sample pulse generator 10 changes slightly, phase comparator 59 senses a phase difference between the output of bandpass filter 54 and voltage controlled oscillator 60. The comparator responds to this phase difference by providing an output voltage to integrator 58 for sufficient time to effectuate a change in output voltage of sample and hold circuit 57. Output signal frequency of voltage controlled oscillator 60 changes accordingly, until it is brought into phase synchronism with the new frequency supplied by narrow bandpass filter 54. Thus, sync circuit 53 maintains the receiver synchronized to the transmitter. Even in event of loss of a few pulses due to temporary interruption in the received signal or attenuation by narrow bandpass filter 54 as a result of high modulation levels, such temporary signal distortion being too brief to appreciably affect output of envelope detector 63, sync pulses continue to be produced at a substantially unchanged rate because of the relatively long time-constant of integrator 58, thereby maintaining the receiver synchronized to the transmitter. Loss of more than a few consecutive pulses, however, causes a drop in output voltage level of envelope detector 63 to a value below that required to actuate threshold detector 56. The threshold detector thus opens the circuit coupling integrator 58 to oscillator 60, so that the voltage stored on sample and hold circuit 57 maintains the frequency of the oscillator at the value at which it operated immediately prior to the actuation of threshold detector 56. When pulses of sufficient amplitude are once again supplied to threshold detector 56, sample and hold circuit 57 again supplies an output from the integrator 58 to oscillator 60 for controlling frequency of the oscillator.

Each sync pulse produced by sync circuit 53 initiates a sawtooth voltage wave from sawtooth generator 66, which is applied to a first input of a two-input summing network 67. The output voltage produced by sawtooth generator 66 comprises a linearly increasing voltage, with respect to time, initiated upon receipt of a sync pulse and terminated upon the receipt of the next sync pulse which simultaneously initiates a new linear increase in voltage with respect to time.

Since sawtooth generator 66 is driven by pulses produced by sync circuit 53, which are produced at the exact repetition rate of sample pulse generator 10 in the transmitter, the period of each sawtooth wave produced by sawtooth generator 66 is exactly equal to the interval between adjacent pulses produced by sample pulse generator 10 of the transmitter.

Output of summing network 67 is applied to a threshold detector 68 which amplifies only those signals above a predetermined amplitude and drives a pulse generator 69 therewith. The pulse generator output signals reset a bistable multivibrator 70 which is set by output from pulse generator 52. Output of the bistable multivibrator, when in the set condition, operates a constant current generator 71 which furnishes constant current to a charge storage circuit 72, such as a capacitor having leakage resistance connected in parallel therewith. Voltage on charge storage circuit 72 is applied through a driver amplifier 73 in series with a variable resistance 74 to the second input of summing network 67.

When no output is produced by driver amplifier 73, pulse generator 69 produces a pulse when the amplitude of voltage produced by sawtooth generator 66 reaches a predetermined level sufficient to be amplified by threshold detector 68. Bistable multivibrator 70 is thus switched to its reset condition. By combining the output voltage wave of sawtooth generator 66 with a relatively constant DC voltage applied through resistance 74 to summing network 67, the time at which bistable multivibrator 70 is switched to its reset condition may be varied with respect to the instant at which a sawtooth voltage wave is initiated. For example, if the voltage supplied to summing network 67 through resistance 74 is of the same polarity as the voltage supplied by sawtooth generator 66, decreasing resistance 74 increases output voltage produced by summing network 67, resulting in earlier resetting of bistable multivibrator 70. Conversely, increasing resistance 74 decreases output voltage produced by summing network 67, resulting in switching of bistable multivibrator 70 to its reset condition at a later time.

Voltage applied to resistance 74 arises as a result of constant current generator 71 supplying charge to charge storage circuit 72. This constant current is supplied to charge storage circuit 72 only when bistable multivibrator 70 is in the set condition; when the multivibrator is in the reset condition, charge on charge storage circuit 72 leaks off at approximately the same rate at which it was acquired.

When unmodulated pulses are received from the transmitter, bistable multivibrator 70 is switched into the set condition upon receipt of each pulse and, when properly adjusted, is reset after half the interval between consecutive received pulses has elapsed. Because charge storage circuit 72 has a relatively long time-constant, and because the charge and discharge rates of this circuit are substantially identical, essentially no output voltage is supplied to driver amplifier 73 under these circumstances, if the circuit is properly adjusted. Even if pulses received from the transmitter are modulated, the long-term average of shift in position of pulses which are position modulated by audio signals is zero. Thus, by metering the output voltage on charge storage circuit 72, resistance 74 may be adjusted so that no net change in voltage appears on charge storage circuit 72. This assures that pulse generator 69 provides output pulses, herein designated "mid-sync" pulses, which occur exactly midway in time between adjacent sync pulses; that is, a mid-sync pulse is produced after a delay of one-half the sync pulse period following each sync pulse. When this condition has been achieved, the output of bistable multivibrator 70 provides combined pulse width modulated (PWM) pulses for all channels; that is, pulse with modulated pulses are produced sequentially for each channel, continually. This is because the instants at which bistable multivibrator 70 is set depend upon the instants at which output pulses are produced by pulse generator 52, while the instants at which the multivibrator is reset remain relatively invariant. Since, as previously shown in connection with FIGURES 5A and 5B, pulses arrive at the receiver either ahead of or behind the time at which they would arrive were they not modulated, resulting in pulse position modulation, bistable multivibrator 70 is accordingly set either earlier or later, respectively, than it would be were the pulses not modulated. Thus, early-arriving modulated pulses result in bistable multivibrator 70 remaining in the set condition for a longer period of time than do later-arriving pulses; hence, the early-arriving pulses result in narrow PWM pulses, while the late-arriving pulses result in wide PWM pulses. If desired, the PWM pulses produced at the reset output of bistable multivibrator 70 may be demultiplexed and converted to respective audio output signals for each of the channels.

Output pulses produced by pulse generator 69 of mid-sync generator 65 are supplied to PAM converter 90 by application to the input of a linear sawtooth voltage generator 75 and the input of a bistable multivibrator 76. However, if a receiving capacity in excess of two channels is required, bistable multivibrator 76 may conveniently be replaced by a ring counter which is stepped from the output of one stage to the next by the mid-sync pulses from pulse generator 69. The ring counter would require one stage for each channel.

In PAM converter 90, a first output from bistable multivibrator 76 is supplied to the input of a pulse generator 79 and to a first input of a two-input AND circuit 78. A second output from bistable multivibrator 76 is supplied to the input of a pulse generator 77 and to a first input of a two-input AND circuit 80. The second inputs to each of AND circuits 78 and 80 are fulfilled by output from pulse generator 52, which comprises position modulated pulses. Output of AND circuit 78, which thus comprises the pulse position modulated signal produced by channel 1 of the transmitter, is supplied to the gating input of a gate circuit 82, while output of AND circuit 80, which comprises the pulse position modulated signal produced by channel 2 of the transmitter, is supplied to the gating input of a gate circuit 84. The pulse position modulated signals produced by AND circuits 78 and 80 may, if desired, be monitored for test purposes or demodulated to provide redundant audio output signals.

Output of sawtooth generator 75 is supplied to the signal inputs of gates 82 and 84, the outputs of which are stored by memory means such as capacitors 81 and 83, respectively, and subsequently applied to the signal inputs of a pair of gated amplifiers 87 and 88, respectively. Gated amplifiers 87 and 88 are actuated by application of output pulses from pulse generators 77 and 79, respectively, to their gating inputs. Output pulses produced by gated amplifiers 87 and 88 comprise the pulse amplitude modulated signals for channels 1 and 2, respectively.

In normal operation of PAM converter 90, each of two-input AND circuits 78 and 80 has one input fulfilled by each pulse received from the transmitter and the second input fulfilled by the respective channel 1 and channel 2 outputs of bistable multivibrator 76 (or ring counter in the event more than two channels are utilized). Generation of a mid-sync pulse by pulse generator 69 switches bistable multivibrator 76 to its channel 1 output condition just prior to receipt of a channel 1 pulse from the transmitter. Both inputs to AND circuit 78 are thus fulfilled at the instant the channel 1 pulse is produced by pulse generator 52. Since pulses at the output of pulse generator 52 are position modulated, it follows that the pulses produced at the output of AND circuit 78 are also position modulated. Gate 82 is momentarily rendered conductive by output from AND circuit 78, causing substantially instantaneous application of output voltage from sawtooth generator 75 onto capacitor 81.

When unmodulated pulses are received on channels 1 and 2, sawtooth generator 75, which produces an output voltage wave increasing linearly with respect to time between each pair of adjacent mid-sync pulses supplied by pulse generator 69, provides an output voltage of one-half the sum of its maximum and minimum to the signal input of gate circuit 82 at the instant at which the gate is rendered conductive by AND circuit 78. In this fashion, a voltage of predetermined amplitude is applied to capacitor 81.

When multivibrator 76 is switched to its channel 1 condition upon receipt of a mid-sync pulse, a voltage of predetermined amplitude on capacitor 83 is passed through gated amplifier 88 due to production of a pulse from pulse generator 79 initiated by the channel 1 output of multivibrator 76. A pulse of amplitude representative of modulation on channel 2 is thus produced at the output of gated amplifier 88, and, since channel 2 is assumed to be unmodulated, this pulse amplitude is equivalent to one-half the sum of the maximum and minimum amplitudes of output voltage produced by sawtooth generator 75 while multivibrator 76 was in its preceding channel 2 output condition. Moreover, it can be seen that production of each unmodulated PAM pulse is delayed by one-half of a channel interval, or one-half the interval between two successive unmodulated pulses from adjacent channels, measured from the instant at which pulse generator 52 provides the initiating pulse. This delay precludes transients in the PAM signal for any channel which might otherwise occur were the PAM output for a given channel produced during receipt of a new voltage by the memory capacitor for that channel.

In the event modulation is applied to channel 1, the channel 1 pulses arrive either earlier or later than they would were they unmodulated. Delay in receipt of a channel 1 pulse delays the time at which both inputs to AND circuit 78 are fulfilled. This has the effect of delaying the momentary conduction interval of gate 82, so that the output voltage produced by sawtooth generator 75 is above one-half the sum of its maximum and minimum at the time gate 82 is opened. Thus, a larger amplitude pulse is stored on capacitor 81 and ultimately provided at the PAM output for channel 1. On the other hand, an early-arriving pulse on channel 1 has the effect of rendering gate 82 conductive at an earlier instant, so that the voltage output of sawtooth generator 75 has not had sufficient time to reach an amplitude halfway between its maximum and minimum limits. Thus, a low amplitude voltage is stored on capacitor 81 and ultimately supplied to the input of gated amplifier 87 so that the amplitude of the pulse produced by the PAM output of channel 1 is less than the amplitude which it would otherwise have were it unmodulated. Under these circumstances, it can be seen that delay in production of modulated PAM pulses, measured from the instant at which pulse generator 52 produces the initiating channel 1 pulse, may extend from a minimum of one-half the guardband interval between adjacent received pulses up to a maximum of one channel interval less one-half the guardband interval between adjacent pulses. Operation of the circuitry for channel 2, when modulated, occurs in similar manner.

Figures 6A, 6B, 6C, 6D:
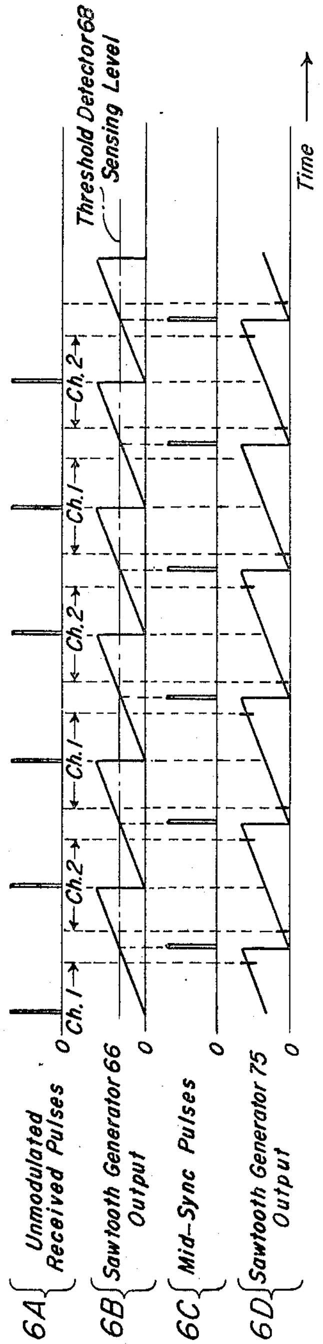
FIGURES 6A–6D are waveforms to aid in illustrating demodulation sequences in the receiver of FIGURE 2.

The demodulation processes of the receiver are illustrated graphically in FIGURES 6A–6D, which are plotted on a common time scale. Thus, FIGURE 6A shows unmodulated pulses produced by pulse generator 52 of the receiver, with maximum limits of modulation about each unmodulated pulse designated by appropriate arrows. The intervals between maximum modulation limits of adjacent channels constitutes the guardbands.

FIGURE 6B shows the output of sawtooth generator 66 in relation to output of pulse generator 52. The sensing level of threshold detector 68 is superimposed thereon, and each time output of sawtooth generator 66 rises above this level, a mid-sync pulse, shown in FIGURE 6C, is produced by pulse generator 69. The mid-sync pulses drive sawtooth generator 75 and bistable multivibrator 76.

FIGURE 6D shows the output of sawtooth generator 75 in relation to the mid-sync pulses of FIGURE 6C. For the unmodulated received PPM pulses shown in FIGURE 6A, the output voltage supplied by sawtooth generator 75 to either of gates 82 or 84 is the voltage midway between the maximum and minimum limits of the sawtooth wave. However, if the PPM pulses of FIGURE 6A were modulated, they would be shifted within the channel limits designated, and the output voltage of sawtooth generator 75 applied to gates 82 and 84 would vary accordingly within these limits. The limits are designated by vertical marks on each of the sawtooth waves in FIGURE 6D.

Each of the output channels at the receiver is capable of synthesizing a transmitter baseband signal from the received PAM pulses on that channel. For this purpose, channel 1 contains a low pass filter 91 coupling the output of gated amplifier 87 to the input of an audio amplifier 92, while channel 2 has a low pass filter 93 coupling the output of gated amplifier 88 to the input of an audio amplifier 94. The combination of low pass filter and audio amplifier in either channel operates in a well-known manner to recover from the PAM pulses a continuous voltage varying at an audio frequency rate, which corresponds to the appropriate baseband signal.

Channel identification may be obtained by detection of the modulation resulting from the subsonic or ultrasonic tone applied to the sync channel, which is designated channel 1 in the transmitter of FIGURE 1. In particular, an appropriate narrow bandpass filter 95 couples the subsonic tone from amplifier 92 through an amplifier 96 to the NOT input of a NOT–AND circuit 97. A first AND input to NOT–AND circuit 97 is fulfilled by the channel 1 output of bistable multivibrator 76, and the second AND input to NOT–AND circuit 97 is fulfilled by output from sync pulse generator 62. Output of the NOT–AND circuit drives the bistable multivibrator 76 or ring counter, as the case may be. Typical NOT–AND circuits are described by Millman and Taub in Pulse and Digital Circuits, published by McGraw-Hill Book Company, Inc., New York, 1956.

When the receiver is operated synchronously and in phase with the transmitter, the NOT input to NOT–AND circuit 97 is continuously fulfilled, since the channel 1 output of amplifier 92 contains the sync channel identification tone; hence, no drive signals are supplied to bistable multivibrator 76 from the NOT–AND circuit. However, the NOT input to NOT–AND circuit 97 is unfulfilled whenever the sync channel identification tone is absent in the channel 1 output of amplifier 92 which, in most instances, is due to a phase difference in channel sequence between the transmitter and receiver. An output signal comprised of a sync pulse is thus produced by NOT–AND circuit 97 each time bistable multivibrator 76 is in the channel 1 output condition, and is supplied to the input of multivibrator 76, thereby advancing the output of PAM converter 90 and hence the channel sequence by one channel for each sync pulse gated through the NOT–AND circuit. It should be noted that the sync pulses are 180° out of phase with the mid-sync pulses produced by pulse generator 69, so that sync pulses applied to multivibrator 76 do not interfere with the mid-sync pulses applied thereto. NOT–AND circuit 97 continues to supply one sync pulse to the multivibrator 76, or ring counter, each time a chanel 1 output is produced therefrom. After a sync pulse has been supplied by NOT–AND circuit 97, assuming that the communication system is only a two channel system, the transmitter and receiver channel sequences will be in phase. However, in the event more than two channels are present in the system, so that stepping means 76 comprises a ring counter, the transmitter and receiver channel sequences may still be out of phase. In such case, the phase difference is detected by NOT–AND circuit 97, and another sync pulse is supplied to stepping means 76, advancing the output therefrom by one channel. This channel advance is repeated once during each complete channel sequence produced at the receiver, until the receiver is once again brought into phase with the transmitter. At this time, the channel identification tone once again appears at the channel 1 output of amplifier 92, fulfilling the NOT input of NOT–AND circuit 97 so that subsequent sync pulses are blocked by the NOT–AND circuit.

Although, in a system involving a large number of channels, phase correction in the foregoing manner may require receipt of a number of cycles of channel pulses before phase synchronization of channel sequence is achieved, the actual time involved is generally negligible. For example, if the system contains 25 channels and transmitted pulses are generated at a 25 kilocycle rate, sweep of one complete cycle for all 25 channels requires but one millisecond. Thus, the maximum time required to bring the receiver into phase synchronization with the transmitter would be but 24 milliseconds. An interruption of such brief nature in telemetering signals, for example, is substantially unnoticeable.

Figure 7:
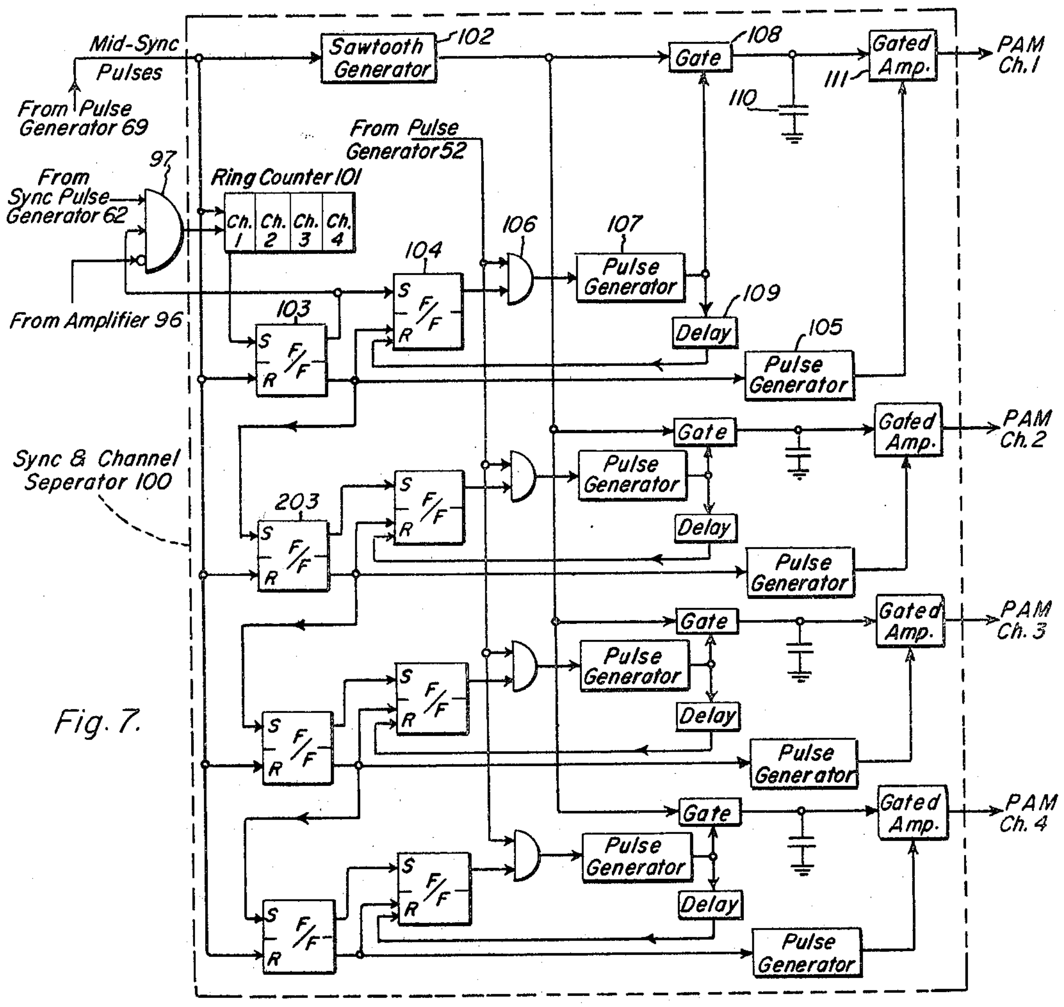
FIGURE 7 is a block diagram of a sync and channel separator which may be substituted for the PAM converter of FIGURE 2.

FIGURE 7 illustrates a sync and channel separator 100 which may be susbtituted for PAM converter 90 in the receiver shown in FIGURE 2. Sync and channel separator 100 provides an additional advantage over the PAM converter of FIGURE 2 in that only a single received pulse in each sampling interval can produce an output, eliminating the deleterious effects which would result if additional undesired pulses were received. Moreover, proper distribution of received pulses to the various output channels is unaffected even when several pulses are not received.

Sync and channel separator 100 is illustrated for a system in which four channels of communication are utilized. Only the circuitry for channel 1 is described hereinbelow, since operation of the channel 2–4 circuitry is identical to that of channel 1.

NOT–AND circuit 97 and pulse generator 69 of the receiver provide drive pulses to a ring counter 101, illustrated as comprising four stages which correspond to the number of output chanels of sync and channel separator 100. Pulse generator 69 of the receiver also drives a sawtooth generator 102, which is similar in function to sawtooth generator 75 of FIGURE 2 in that the output signal comprises linear sawtooth voltages extending between successive mid-sync pulses, similar to the waveforms shown in FIGURE 6D.

Output of the first or channel 1 stage of ring counter 101 is coupled to the set input of a flip-flop circuit 103, which receives reset pulses from mid-sync generator 69. Flip-flop circuit 103, when in the set condition, supplies output signals to the set input of a flip-flop circuit 104 as well as to one of the AND inputs of NOT–AND circuit 97. The other AND input of NOT–AND circuit 97 is energized by sync pulse generator 62 of the receiver, while the NOT input thereto is energized by amplifier 96 of the receiver. Output of flip-flop circuit 103, when switched into the reset condition, resets flip-flop circuit 104, drives a pulse generator 105, and sets a flip-flop circuit 203 in the channel 2 circuitry.

Output of flip-flop circuit 104, when in the set condition, fulfills one input to a two-input AND gate 106, while the second input thereto is fulfilled by pulse generator 52 of the receiver. Output signals of AND gate 106 drive a pulse generator 107. Output of pulse generator 107 momentarily drives a gate 108 into its conductive condition and, after a brief delay introduced by a delay circuit 109, resets flip-flop circuit 104. Output of sawtooth generator 102 is coupled to the signal input of gate 108. When gate 108 is momentarily driven into conduction by pulse generator 107, instantaneous output voltage from sawtooth generator 102 is applied to a capacitor 110 and stored thereon, so as to appear at the input of a gated amplifier 111, the control input of which is energized by pulses from pulse generator 105. Output signals of gated amplifier 111 comprise the PAM signals for channel 1, which may be applied to low pass filter 91 of the receiver.

In operation, ring counter 101 is driven in synchronism with mid-sync pulses from pulse generator 69. Each time ring counter 101 is driven into the channel 1 condition, flip-flop circuit 103 is set. However, this set condition occurs subsequent to the reset condition produced directly by the mid-sync pulses, due to a very small amount of delay introduced by the ring counter circuitry. Upon becoming set, flip-flop circuit 103 sets flip-flop circuit 104, fulfilling the first input to AND gate 106. A pulse then provided by pulse generator 52 in response to a PPM pulse fulfills the second input to AND gate 106, causing pulse generator 107 to produce an output pulse. At this instant, gate 108 is momentarily rendered conductive so that the instantaneous output voltage of sawtooth generator 102 is impressed upon capacitor 110. After a brief time delay following generation of the pulse generator 107 output pulse, flip-flop circuit 104 is reset through delay circuit 109.

Upon occurrence of the next mid-sync pulse, flip-flop circuit 103 is reset, driving pulse generator 105 to render gated amplifier 111 momentarily conductive. During this instant, voltage stored on capacitor 110 is produced at the channel 1 output of sync and channel separator 100 to comprise a receiver channel 1 PAM output pulse of amplitude determined by modulation at the transmitter. The latter mid-sync pulse also resets flip-flop circuit 203, which is immediately thereafter driven into the set condition by the reset output of flip-flop circuit 103. At this time, a sequence of events similar to those described for channel 1 occurs in channel 2 of the sync and channel separator.

Ring counter 101 is continually driven sequentially through its four steps by the mid-sync pulses. Since flip-flop circuit 103 is set by an output signal from the first stage of the ring counter, rather than by an output signal from a flip-flop circuit in the fourth channel circuitry of sync and channel separator 100, phase differences between transmitter and receiver channel sequences are readily corrected. Hence, if the received channel sequence differs in phase with the transmitted channel sequence, additional pulses are applied to ring counter 101 from sync pulse generator 62. These additional pulses, which occur midway in time between adjacent mid-sync pulses, are supplied to ring counter 101 through NOT-AND circuit 97. Thus, when the ring counter is in the channel 1 condition, so that flip-flop circuit 103 is in its set condition, and assuming the channel identification tone is not present in the output signal of amplifier 96, a single sync pulse is applied to ring counter 101, advancing the output thereof by one stage. If, when ring counter 101 again reaches in its channel 1 condition, the channel identification tone is still missing from the output signal of amplifier 96, ring counter 101 is again driven by a single sync pulse from generator 62. This process continues until the channel identification tone is once again present in the output signal of amplifier 96 when ring counter 101 is in its channel 1 condition.

It should be noted that upon receipt of a pulse from pulse generator 52, delay circuit 109 resets flip-flop 104, leaving the first input to AND gate 106 unfulfilled. Thus, any additional pulses which may be produced by pulse generator 52 within the same sampling interval, caused by receipt of spurious pulses by the receiver, are prevented from driving pulse generator 107 and producing noise on channel 1. Moreover, since the mid-sync pulses are generated in response to sync pulses, absence of pulses from pulse generator 52 during the sampling interval fails to upset the channel 1 sequence because the mid-sync pulse following this interval resets flip-flop 103 which then both resets flip-flop 104 and sets flip-flop 203. The next pulse produced by pulse generator 52 will then energize the output of channel 2, provided the channel 2 pulse has been received by the receiver.

Sync and channel separator 100 is also capable of providing PPM pulses instead of PAM pulses, simply by utilizing the output of pulse generator 107 directly. Alternatively, PWM modulation might also be obtained by merely coupling the output of a constant current generator to one input of a two-input AND gate, the other input of which is energized by flip-flop 104 when in the set condition.

Figure 8:
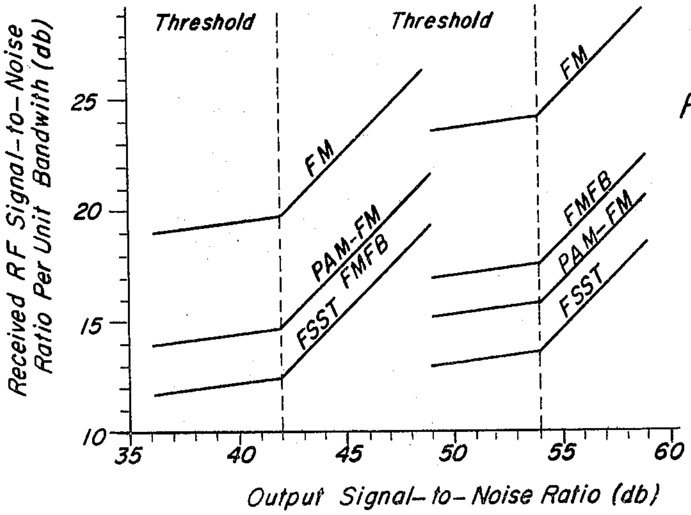
FIGURE 8 is a comparison of performance characteristics of particular communication systems including that of the instant invention.

FIGURE 8 illustrates comparative performance of the communication system provided by the instant invention with respect to ordinary FM systems, FM systems with frequency feedback demodulation (FMFB), and PAM–FM systems using frequency spectrum analysis demodulation, for noise improvement thresholds occurring at output signal-to-noise ratios of 42 db and 54 db. The ordinate represents signal-to-noise ratio of the received RF signal, while the abscissa represents signal-to-noise ratio of the recovered output signal at the receiver. The noise improvement threshold corresponds to the lowest level of RF signal-to-noise ratio at which a slight increase in this level provides a drastic increase in signal-to-noise ratio of the baseband signal recovered at the receiver. Although the relative merits of the various systems depend upon the desired performance level, it can be seen that for a noise improvement threshold at an output signal-to-noise ratio of 42 db, FSST modulation provides a 2.3 db improvement in noise improvement threshold over PAM–FM and FMFB and a 7.5 db improvement over ordinary FM. For a noise improvement threshold occurring at an output signal-to-noise ratio of 54 db, FSST provides a 2.3 db improvement in noise improvement threshold over PAM–FM, a 4.2 db improvement over FMFB, and an 11 db improvement over conventional FM.

The foregoing describes a frequency shifted sliding tone analog data communication system having a reduced noise improvement threshold. The system enables transmitted consecutive samplings of baseband signals to overlap in time in order to enhance the quality of the received signal. The frequency of repetitive chirps is shifted by an amount varying linearly with the sampled amplitude of baseband signals. In addition, synchronism may be maintained locally at the receiver, even in the temporary absence of received synchronizing pulses.

While only certain preferred features of the invention have been shown by way of illustration, many changes and modifications will occur to those skilled in the art. It is, therefore, to be understood that the appended claims are intended to cover all such changes and modifications as fall within the true spirit and scope of my invention.

What I claim as new and desire to secure by Letters Patent of the United States is:

1. A sampled data communication system comprising:

(A) transmitting means including a plurality of communication channels, each of said channels including, (1) means for repetitively generating uniform bandwidth linear frequency sweeps through a frequency spectrum at a common sweep repetition rate and coherent phase, each sweep being initiated prior to completion of the immediately preceding sweep in another channel, (2) baseband signal generating means, (3) frequency generating means responsive to the baseband signal generating means and producing an output frequency varying discretely in accordance with instantaneous amplitude of the baseband signals at predetermined sampling instants, and (4) frequency mixing means responsive jointly to said linear frequency sweep generating means and said variable frequency generating means for providing output linear frequency sweeps through uniform bandwidth portions of the frequency spectrum selected in accordance with the discretely varying output frequency;

(B) linear adder means responsive to the frequency mixing means of each channel for interlacing the output linear frequency sweeps of each channel with all adjacent sweeps overlapping in time;

(C) pulse receiving means including pulse compressing means responsive to the output of the linear adder means; and (D) pulse distributing means responsive to the pulse compressing means for allocating pulses to individual receiver channel outputs.

2. The sampled data communication system of claim 1 wherein said pulse distributing means includes means for converting position modulated pulses to amplitude modulated pulses.

3. The sampled data communication system of claim 1 including synchronizer means coupling said pulse receiving means to said pulse distributing means for operating said pulse distributing means in synchronism with the sequence of channel signals received by said pulse receiving means.

4. The sampled data communication system of claim 3 wherein said synchronizer means includes memory means for storing pulse repetition rate data and generating means responsive to said memory means for producing pulses at said repetition rate during temporary absence of pulses supplied by said pulse receiving means.

5. The sampled data communication system of claim 1 wherein said transmitting means includes pulse generating means, and each said linear frequency sweep generating means comprises a dispersive delay line coupled to said pulse generating means.

6. The sampled data communication system of claim 5 wherein said pulse compressing means comprises another dispersive delay line.

7. The sampled data communication system of claim 2 wherein said transmitting means includes pulse generating means, each said linear frequency sweep generating means comprises a dispersive delay line coupled to said pulse generating means, and said pulse compressing means comprises another dispersive delay line.

8. The sampled data communication system of claim 3 wherein said transmitting means includes pulse generating means, each said linear frequency sweep generating means comprises a dispersive delay line coupled to said pulse generating means, and said pulse compressing means comprises another dispersive delay line.

9. The sampled data communication system of claim 3 wherein said pulse distributing means includes means for converting position modulated pulses to amplitude modulated pulses, said converting means comprising sawtooth voltage generating means responsive to said synchronizer means and gating means actuated by said pulse receiving means, said gating means being responsive to said sawtooth voltage generating means and providing output pulses of amplitude corresponding to amplitude of the sawtooth voltage at the instant said gating means is actuated.

10. The sampled data communication system of claim 9 including time delay means coupling said synchronizer means to said sawtooth voltage generating means, said time delay means introducing a delay of substantially one-half the period of said synchronizer means.

11. The sampled data communication system of claim 1 wherein said pulse distributing means comprises gating means associated with each of said channels respectively, each of said gating means being coupled to said pulse receiving means, switching means sequentially rendering each of said gating means conductive for a predetermined interval, and delay means coupling each of said gating means to said switching means for rendering said conductive gating means nonconductive after said conductive gating means provides a single output pulse but prior to completion of said predetermined interval.

12. The sampled data communication system of claim 11 including synchronizer means coupling said pulse receiving means to said switching means for operating said switching means in synchronism with the sequence of channels received by said pulse receiving means.

13. The sampled data communication system of claim 11 wherein said switching means includes pulse counting means producing an output voltage each time the number of counted pulses corresponds to the number of channels in the system, a plurality of bistable circuit means, each of said bistable circuit means being associated with each of said channels respectively, means coupling the output of said pulse counting means to the set input of a first of said bistable circuit means, means coupling the reset output of each of said bistable circuit means respectively to the set input of the bistable circuit means associated with the next successive channel respectively, and means coupling the set output of each of said bistable circuit means to each of said gating means respectively; said system further including synchronizer means responsive to said pulse receiving means and generating sync pulses at a substantially constant repetition rate, and time delay means coupling said synchronizer means to the input of said pulse counting means and the reset inputs of each of said bistable circuit means.

14. The sampled data communication system of claim 13 including logic circuit means jointly responsive to a selected receiver channel output, said switching means and said synchronizer means; said logic circuit means being drivingly coupled to said pulse counting means and altering the count of said pulse counting means each time a predetermined signal is absent from said selected receiver channel output while said selected receiver channel is producing an output pulse.

15. A sampled data communication system comprising:

(A) first means for repetitively generating first uniform duration linear frequency sweeps of coherent phase through a frequency spectrum at a constant sweep repetition rate, each of said first linear frequency sweeps being initiated at intervals of at least said uniform duration;

(B) second means for repetitively generating second linear frequency sweeps of said uniform duration through the frequency spectrum at said constant sweep repetition rate, each of said second linear frequency sweeps being initiated prior to completion of the immediately preceding first linear frequency sweep;

(C) first and second sources of baseband signals;

(D) first and second frequency generating means responsive to said first and second baseband signal sources respectively and producing first and second output frequencies respectively varying discretely in accordance with instantaneous amplitude of said first and said second baseband signal sources respectively at predetermined sampling instants;

(E) first and second frequency mixing means responsive to said first and second linear frequency sweep generating means respectively and to said first and second variable frequency generating means respectively for providing output linear frequency sweeps through uniform bandwidth portions of the frequency spectrum selected in accordance with the first and second discretely varying output frequencies respectively;

(F) linear adder means responsive to the first and second frequency mixing means for interlacing the output linear frequency sweeps;

(G) pulse receiving means including pulse compressing means responsive to the output of the linear adder means;

(H) first and second output means for synthesizing said first and second baseband signals, respectively; and (I) pulse distributing means responsive to the pulse compressing means for allocating pulses to said first and second output means.

16. The sampled data communication system of claim 15 wherein said pulse compressing means comprises a dispersive delay line.

17. The sampled data communication system of claim 15 wherein said first and second means for repetitively generating linear frequency sweeps include bandpass filter means for imposing a Gaussian voltage amplitude on each of said sweeps, and said pulse receiving means includes additional filter means responsive to said pulse compressing means, said additional filter means having a Gaussian frequency characteristic.

18. The sample data communication system of claim 17 wherein said pulse compressing means comprises a dispersive delay line.

References Cited

UNITED STATES PATENTS

| | | | |
|---|---|---|---|
| 2,839,604 | 6/1958 | Shank | 325—30 X |
| 3,020,399 | 2/1962 | Hollis | 325—30 |
| 3,328,528 | 6/1967 | Darlington | 325—65 X |

RALPH D. BLAKESLEE, Primary Examiner

W. S. FROMMER, Assistant Examiner

U.S. Cl. X.R.

179—15; 325—34, 59, 61, 65, 131, 315, 321; 340—171